United States Patent [19]
Gambaro

[11] Patent Number: 5,178,477
[45] Date of Patent: Jan. 12, 1993

[54] ERGONOMIC KEYBOARD INPUT DEVICE

[76] Inventor: Thomas L. Gambaro, 3231 SE. 36th Ave., Portland, Oreg. 97202

[21] Appl. No.: 711,760

[22] Filed: Jun. 6, 1991

[51] Int. Cl.$^5$ .............................. B41J 5/28; B41J 5/10
[52] U.S. Cl. ..................................... 400/489; 400/492
[58] Field of Search ........................ 400/489, 486, 492

[56] References Cited

U.S. PATENT DOCUMENTS

| | | | |
|---|---|---|---|
| 2,369,807 | 2/1945 | Solon | 400/489 |
| 4,224,659 | 1/1981 | Malt | 400/489 |
| 4,332,493 | 6/1982 | Einbinder | 400/486 |
| 4,579,470 | 4/1986 | Casey | 400/486 |
| 4,597,681 | 7/1986 | Hodges | 400/488 |
| 4,824,268 | 4/1989 | Diernisse | 400/486 |
| 4,849,732 | 7/1989 | Dolenc | 400/489 |
| 4,913,573 | 4/1990 | Retter | 400/489 |

FOREIGN PATENT DOCUMENTS 2725677 12/1977 Fed. Rep. of Germany ...... 400/486

OTHER PUBLICATIONS

IBM Technical Disclosure Bulletin, vol. 25, No. 9, Feb. 1983 "Kana Keyboard with Palm Rest".

British Printer Sep., 1977.

Primary Examiner—David A. Wiecking
Assistant Examiner—Anthony H. Nguyen
Attorney, Agent, or Firm—Kolisch, Hartwell, Dickinson, McCormack & Heuser

[57] ABSTRACT

An ergonomic keyboard input device for use with a coupled electronic system, such as a computer. The device includes a keyboard which is organized with an array of actuation keys that are disposed generally to complement the splayed underside architecture of a user's hand. A two-handed implementation is disclosed wherein each array includes, for each finger in a hand, an associable cluster of input keys which are placed in such a manner that they enable key actuation via only slight, gestural, relatively closing motion of a portion of a confronting finger, and for the thumb in each hand, an associable cluster of keys disposed generally over three mutually intersecting, and somewhat orthogonal, surfaces that enable thumb/key actuation via mixed lateral, and slight endo, translation of the thumb generally within a cone of motion whose apex resides adjacent the base of the thumb.

16 Claims, 3 Drawing Sheets

U.S. Patent    Jan. 12, 1993    Sheet 1 of 3    5,178,477
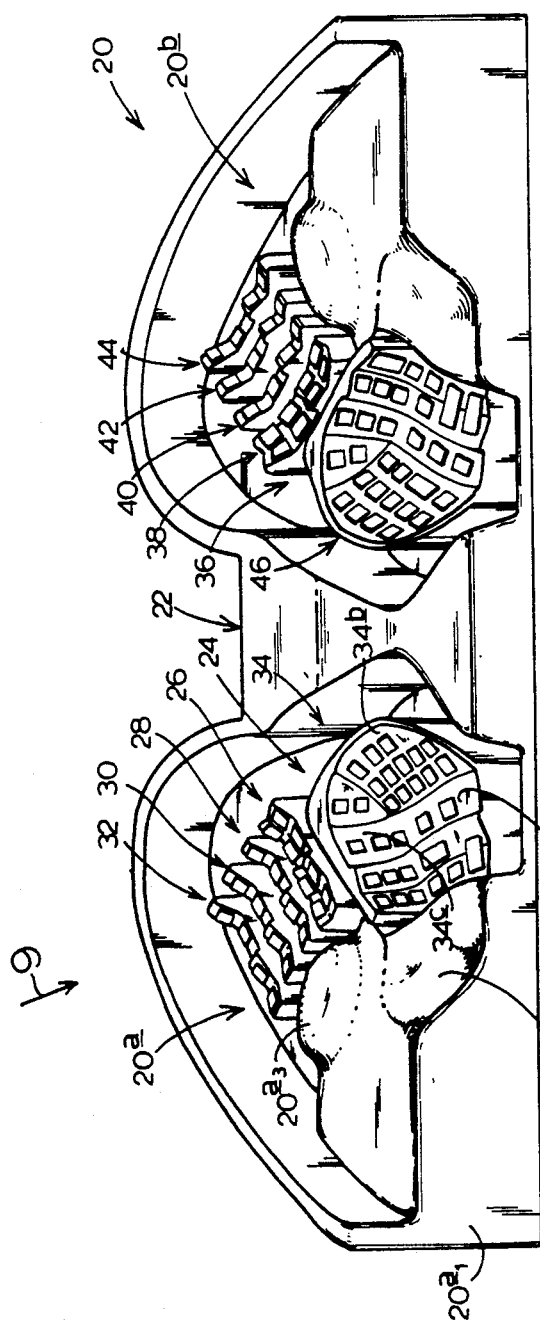
FIG.1
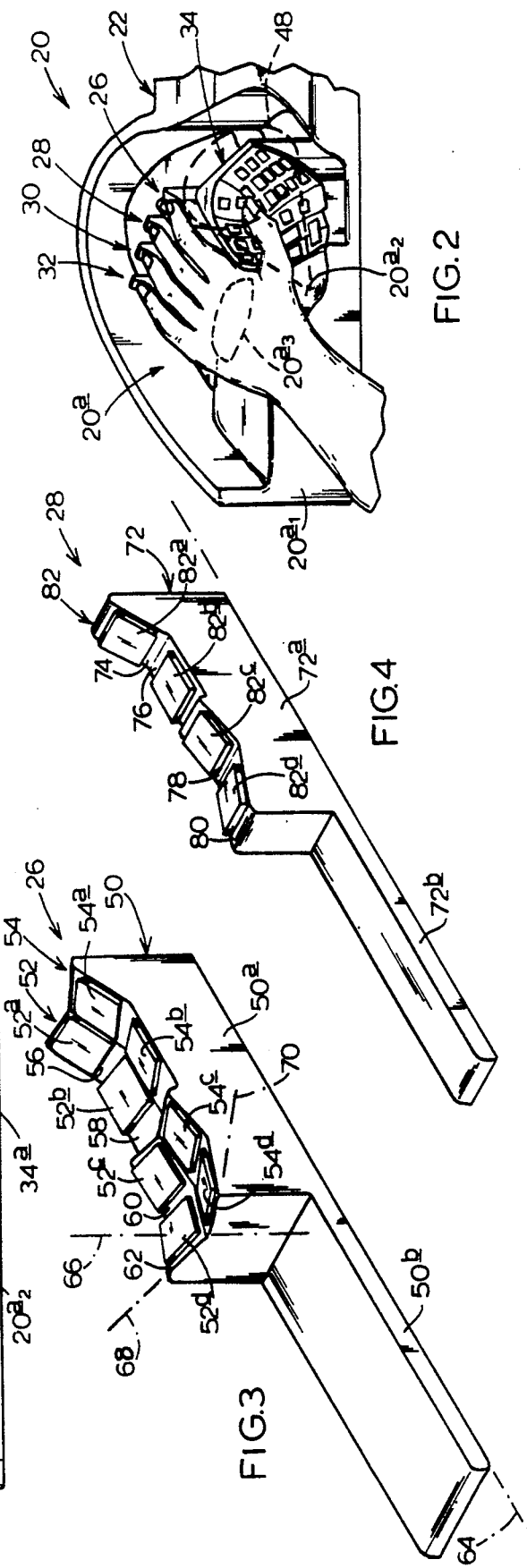
FIG.2
FIG.3
FIG.4

ERGONOMIC KEYBOARD INPUT DEVICE

BACKGROUND AND SUMMARY OF THE INVENTION

The present invention relates to a keyboard input device for transmitting information to a suitably coupled electronic system, such as a digital computer. More particularly, it relates to such a device wherein the keyboard is specially ergonomically designed with reference to the architecture of the human hand in such a fashion that, at least with respect to the fingers on the hand, only slight gestural finger motion is required for effective, multiple, differentiated key actuation.

In recent past years, there has been a dynamic and explosive growth in the use of keyboard devices. This growth, as many know, has been driven largely by the proliferation and ready availability of computer systems for substantially all arenas of society, ranging from business to individual settings. Accompanying this explosion, unhappily, for those who spend many hours using such devices are various annoying and debilitating muscular syndromes that result from repetitive, fatiguing hand, wrist and finger motions that are required in the use of the ubiquitous, conventional typewriter-like keyboards. These syndromes translate not only into pain and discomfort for the affected users, but also into significant loss of productivity—clearly two problems to which corrective attention should be given.

Attention to this problem, generally, is not new in the art, as is evidenced by many serious attempts to alleviate keyboard-use "injuries" through innovative keyboard layouts and architectural designs. Two very good illustrations of approaches taken in the prior art are illustrated in U.S. Pat. Nos. 4,332,493 to Einbinder, and 4,849,732 to Dolenc.

The Einbinder patent discloses a typewriter keyboard in which, not only are keys laid out in a fashion relating to what might be thought of as the "footprint" of the human hand, but also the proposed keys are designed with topographically height- and angle-differentiated actuation pads that tend to minimize, somewhat, overall hand and finger motion during use. However, the Einbinder system still focuses significant attention on the importance of having so-called "home positions" for the finger and thumb tips, from which positions the fingers (and therefore the hands) must travel appreciably in order to perform the usual kinds of typing operations. Thus, the Einbinder approach steps toward, but closes only a portion of the gap in, solving the motion difficulties encountered with conventional keyboards. Put another way, Einbinder does not substantially eliminate these difficulties.

The Dolenc patent illustrates and describes a one-hand key shell which includes fan-like arrays of plural keys distributed in elongate rows and organized for specific actuation by the thumb and four fingers of a hand. Angular and topographical distinctions for individual keys, such as those shown in the Einbinder patent, are not present in the Dolenc system. Dolenc also, apparently, does not establish a "home position" for the tips of the fingers and thumb. Dolenc is concerned with minimizing hand motion, but not particularly finger motion. In fact, Dolenc speaks in terms of organizing keys in the arrays in such a fashion that they take into account the "motion and range of the respective fingers of the hand". Thus, Dolenc clearly contemplates finger-tip actuation of each key, and reinforces this concept by teaching that a full equivalent of the push-button keys which he illustrates could take the form of a series of flat-panel touch pads. Accordingly, while Dolenc seriously addresses the issue of minimizing hand motion, his system does not appreciably contribute to minimizing finger motion (and hence related wrist motion).

There are other patents of which I am aware that address, to different degrees, modified keyboard arrangements. These include U.S. Pat. Nos. 2,369,807 to Solon, 4,244,659 to Malt, 4,579,470 to Casey, 4,597,681 to Hodges, and 4,824,268 to Diernisse H.V. None of these latter-mentioned five patents appears to address, at least as pointedly as Einbinder and Dolenc, the issues of keyboard motion "injuries".

Given this known setting in the prior art, and the strong concern about keyboard "motion" problems, it is an important object of the present invention to provide an ergonomic keyboard input device which comprehensively addresses the use-motion injury problem, with focus directed at the entire family of hand-, wrist- and finger-motion issues.

Another object of the invention is provide such a device which accomplishes the above object in a setting where the resulting design fits in close complementary relationship with the underside architecture of the hand, in a manner which requires what is referred to herein as only slight gestural motion of different portions of a user's fingers to effect appropriate key actuation.

The preferred embodiment of the invention which is described herein requires no appreciable hand, wrist or finger motion. More specifically, input use of the proposed device does not require shifting of the hand from a rest position, and does not require wrist rotation for maneuvers that are performed by the four fingers and the thumb. The fingers are not required to start, and then to shift, from conventional "home positions". Rather, instead of focusing on finger-tip key actuation, the keyboard device of the invention is designed to call for only slight gestural motion of different portions of and beneath a person's fingers for actuation of related, facially confronting keys. Thus, and respecting the fingers, different regions adjacent a finger tip are used to actuate different keys, and different regions remote from the finger tips are used to actuate other keys.

Recognizing that a one-size-fits-all approach may not be entirely appropriate to deal with users' hands that are significantly larger or smaller than, say, hands fitting within the "median" of hand sizes, the structure of the invention proposed herein permits positional adjustment of arrays and clusters of keys to accommodate a size-differential concern.

These and other objects attained, and advantages offered, by the present invention will become more fully apparent as the description that now follows is read in conjunction with the accompanying drawings.

DESCRIPTION OF THE DRAWINGS

FIG. 1 is a top, front, perspective view illustrating a keyboard input device constructed in accordance with the present invention.

FIG. 2 is a fragmentary, reduced-scale view of the left side of FIG. 1 illustrating the relative position of a user's left hand with respect to the left side of the device of FIG. 1.

FIG. 3 is an enlarged-scale view illustrating a cluster of keys, and the mounting structure provided therefor, designed for use by the forefinger, and shown isolated from the other structure of FIGS. 1 and 2.

FIG. 4 is a view similar to that presented in FIG. 3 illustrating a cluster of keys, and mounting structure provided therefor, designed for use for a finger other than the forefinger.

DETAILED DESCRIPTION AND BEST MODE FOR CARRYING OUT THE INVENTION

Figure 7:
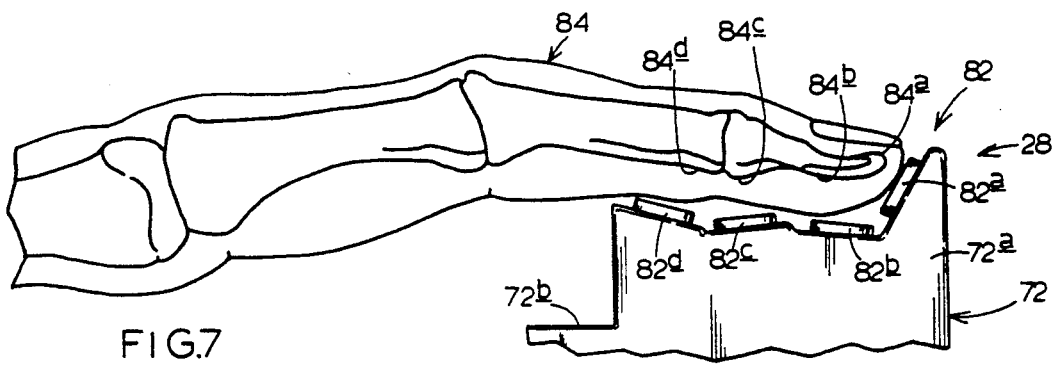
FIG. 7 is a fragmentary side view of a structure like those shown in FIGS. 3 and 4 illustrating the nominal position of a user's finger with respect to this structure.

Turning attention now to the drawings, and referring first of all to FIG. 1, here there is indicated generally at 20 a specially ergonomically designed keyboard input device for transmitting information by a human operator (user) to a suitable electronic system (not shown) such as a computer, coupled with device 20. Such a coupling arrangement is very well known to those skilled in the art, forms no part of the present invention, and hence is omitted from the drawings and from any further discussion.

In accordance with some of the major underlying concerns to which the design of the present invention is directed, device 20 takes on what might be thought of as a highly sculptural form which is intended, in certain operative regions therein, to complement closely the typical underside architecture of the human hand. Accordingly, device 20 has a sort of bilateral symmetry which can be seen in FIG. 1, with a left side 20a that forms a sort of curvilinear keyboard amphitheater for a user's left hand, and with a right side 20b which offers the same kind of setting for a user's right hand.

Further describing device 20, it includes a base 22 which is preferably formed of a lightweight molded plastic material, with this base having generally the shape shown for it in FIG. 1. Referring just to the left-hand side of FIG. 1, it is the shape of base 22 in this region which defines what was referred to just above as the left-hand keyboard amphitheater, and here one can see a riser structure $20a_1$ which is formed with a curvilinear relief $20a_2$ and a mound-like, curvilinear mesa $20a_3$. These last three mentioned portions of the base function collectively to provide motion-free wrist, hand and palm support for a user's left hand. Relief $20a_2$ is shaped to receive comfortably the base of the left thumb with respect to which the thumb, during key actuation which will be described shortly, moves generally throughout a cone of motion whose apex is near this relieved region. Mesa $20a_3$ acts as a palm-rest support structure for the user's left hand.

Extending angularly and to the right generally away from the structure which has just been described in the left-hand amphitheater is an array of keys 24, including four finger clusters 26, 28, 30, 32, and a thumb cluster 34. As will be explained further, finger cluster 26 is designed to underlie the user's left forefinger which, in device 20, is given the task of actuating eight different keys distributed in two elongate rows of four keys each. In FIG. 1, these eight keys are represented by the raised square forms shown in this figure. Finger clusters 28, 30, 32 each carries a single row of four keys, with cluster 28 intended to underlie the left third finger, cluster 30 to underlie the left fourth finger, and cluster 32 to underlie the left fifth finger. The four finger clusters radiate appropriately from a region of projected confluence near mesa $20a_3$, thus dispositionally reflecting the splayed, or fan-like, nature of the fingers in the human hand.

Thumb cluster 34 is quite different in typography and construction from the mentioned finger clusters. A thoughtful look at cluster 34 reveals that, for the thumb, it defines what might be thought of as a keyboard sub-amphitheater which lies just slightly off-shore the near edge of riser $20a_1$ in the region of relief $20a_2$. The interior, key-containing expanse of the support structure for the keys in cluster 34, while quite curvilinear in nature, can be thought of as being formed by the mutual intersection of three surfaces which, in a very general sense, lie orthogonally with respect to each other. These three surfaces are touched by lead lines 34a, 34b and 34c in FIG. 1.

The keyboard structure which is provided for the user's right hand in device 20, appearing on the right-hand side of FIG. 1, is, generally speaking, nearly a mirror image of what has just been generally described on the left-hand side of FIG. 1. Thus, there is provided an array of keys 36 which includes finger clusters 38, 40, 42, 44 which correspond to previously mentioned clusters 26, 28, 30, 32, respectively, and a thumb cluster 46 which corresponds to previously mentioned thumb cluster 34.

Arrays 24, 36 collectively make up what is referred to herein as a keyboard. As will be explained, naturally, the specific keys which are placed for left-hand and right-hand actuation, respectively, are different.

FIG. 2 illustrates generally how a user's left hand is placed in an operative position. As can be seen here, structural regions $20a_1$, $20a_2$, $20a_3$ provide support for the base region in the hand, with the hand's forefinger lying over cluster 26, the third, fourth and fifth fingers overlying clusters 28, 30, 32, respectively, and the thumb extending into cluster 34. The base of the thumb is comfortably supported in relief $20a_2$, and is movable for key actuation throughout what is referred to herein as a cone of motion, shown in dashed lines at 48, whose apex is disposed generally adjacent the base of the thumb.

Turning attention now to FIG. 3, forefinger cluster 26 includes a base support structure 50 having a riser 50a which joins with a mounting tongue 50b. Preferably, base 50 is formed of a suitable lightweight molded plastic material which may be the same as that preferably employed for formation of base 22. The upper surface of riser 50a is formed to define angularly offset support planes for eight different keys which are distributed in two rows of four each, these two rows being indicated generally at 52, 54. Key row 52 includes four keys 52a, 52b, 52c, 52d, and key row 54 includes four keys 54a, 54b, 54c, 54d. Each of these keys herein is conventional in construction and takes the form of a momentary push button.

The keys in each of the two rows just mentioned lie on planar surfaces which are formed in base 50, and four of these surfaces which support keys 52a, 52b, 52c, 52d are shown at 56, 58, 60, 62, respectively. Along the length of cluster 26, these planes intersect one another in a mixed pattern of obtuse and reflex angles according to the invention, and in this respect, planes 56, 58 intersect one another at an obtuse angle of about 105-degrees, planes 58, 60 at a reflex angle of about 210-degrees, and planes 60, 62 at an obtuse angle of about 150-degrees. As can be seen, there is a slight step which is formed between planes 58, 60. Dash-dot line 64 in FIG. 3 represents a horizontal line, and with respect to a horizontal plane containing line 64, plane 56 slopes downwardly and toward the viewer in FIG. 3 to intersect such a horizontal plane at an obtuse angle of about 120-degrees.

The angular dispositions just described between the support planar surfaces for the keys in row 52 have been selected herein, as will be explained, to take advantage of the underside architecture of the skin and bone structure in a user's forefinger.

The four keys in row 54 are supported on similar support planes that are formed in base 50. Considering an angular relationship which exists herein generally between the lateral companion planes for rows 50, 54, dash-dot line 66 represents a vertical line. Relative to the vertical, and as indicated by dash-dot lines 68, 70, the laterally adjacent support planes on riser 50a intersect one another at an obtuse angle of about 150-degrees. This angle has been chosen in order to position, laterally, the eight keys in cluster 26 for suitable forefinger actuation. Thus, the keys mentioned above in cluster 26 may be thought of as having actuation axes, respectively, which intersect normally the respective underlying support planes provided for the keys. A direct showing of these axes in FIG. 3 has been omitted in order to avoid overcomplexity in FIG. 3.

Directing attention now to FIG. 4, finger cluster 28 includes a base support structure 72 which, like previously mentioned structure 50, includes a riser 72a and a mounting tongue 72b. The upper surface of riser 72a is formed with four planar support surfaces, 74, 76, 78, 80 which carry a row 82 including four keys 82a, 82b, 82c, 82d, respectively. The planes of surfaces 74, 76, 78, 80 intersect one another in a mixed pattern of obtuse and reflex angles which is the same pattern described for the respective rows of intersecting planes mentioned in conjunction with FIG. 3. As was pointed out earlier, cluster 28 is provided for accommodating a user's left third finger. Clusters 30, 32 are similarly constructed.

Dimension specifications, while not set forth herein, should preferably be such that the respective finger clusters have lengths that enable them to relate closely to the outer extremities of the fingers, and particularly to that stretch of the fingers which extends between the ungual tuberosity of the third phalanx to and including the head of the second phalanx. FIG. 7 illustrates at 84 a typical finger having the desired relationship with a row of keys, such as row 82 in cluster 28. Parts of the skeletal architecture of finger 84 which are of importance herein are the tip of the ungual tuberosity 84a in the third phalanx, the base 84b of the ungual tuberosity, the base of the third phalanx 84c, and the head 84d of the second phalanx in the finger.

Figure 8:
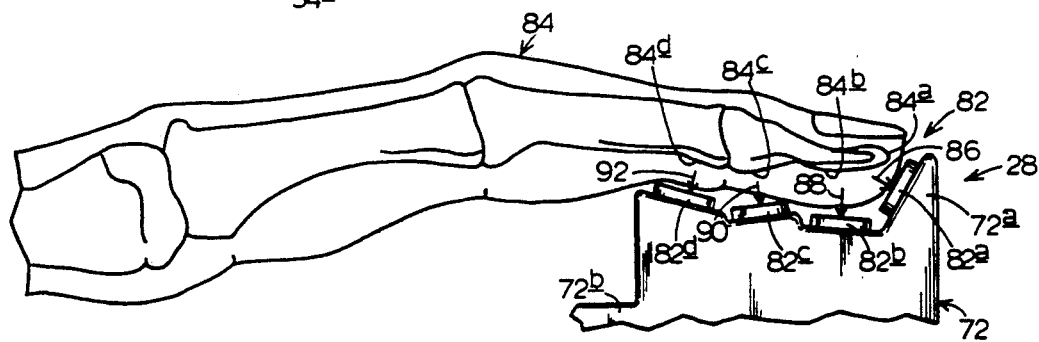
FIG. 8 is similar to FIG. 7 with the exception that it illustrates specifically different gesture motions used by a finger to perform key actuation.

Switching attention to FIG. 8, the four stubby arrows shown at 86, 88, 90, 92 illustrate the slight gestural closing motion which is all that is required to actuate the four keys in row 82. Slight forward motion of the tip of the ungual tuberosity in the direction of arrow 86 causes actuation of key 82a. Slight downward motion of the base of the ungual tuberosity in the direction of arrow 88 actuates key 82b. Slight downward rocking of the third phalanx produces actuation in the direction of arrow 90 of key 82c by the base of the third phalanx 84c. Slight downward and rearward rocking of the finger causes the head of the second phalanx to actuate key 82d in the direction of arrow 92. In the cases of the clusters which are provided for the two forefingers, these same kinds of motions are made with the addition of one other slight gestural motion which is a lateral motion to take into account the requirement for the forefingers to actuate four keys in each of two laterally adjacent rows. These motions of a user's fingers, one can see, are accomplished with substantially no wrist or hand motion, and only extremely slight finger motion.

Figures 5, 6:
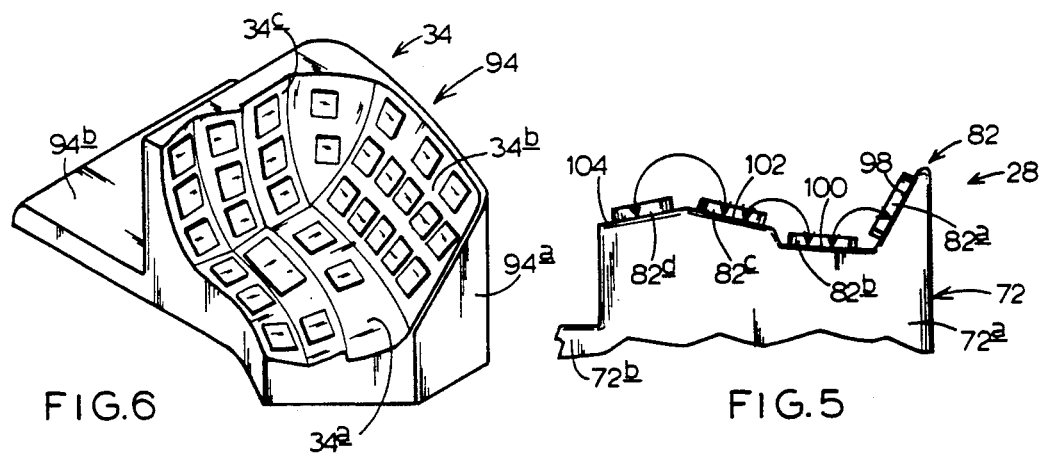
FIG. 5 is a fragmentary side elevation of a modified form of the structures shown in FIGS. 3 and 4.
FIG. 6 is an isolated, removed, large-scale detail of a cluster of keys, and of the mounting structure provided therefor, for use by the thumb, and particularly (in this figure) for a user's left thumb.

FIG. 6 illustrates an isolated view of previously mentioned thumb cluster 34. The keys in this cluster are mounted in what was referred to earlier as the subamphitheater which is formed with intersecting surfaces 34a, 34b, 34c which exist in a riser 94a in a base support structure 94. Extending to the left and away from the viewer in FIG. 6 is a mounting tongue 94b which also forms part of structure 94. The keys for actuation by the left thumb are suitably mounted on surfaces 34a, 34b, 34c, and as was mentioned earlier, the thumb moves laterally, and fore and aft, within previously mentioned cone of motion 48 (see FIG. 2) to actuate these keys. Thus, the user's thumbs are called upon to engage in a bit more motion than that which is required of the fingers, but not so much motion that appreciable hand and wrist motions are required.

Figure 9:
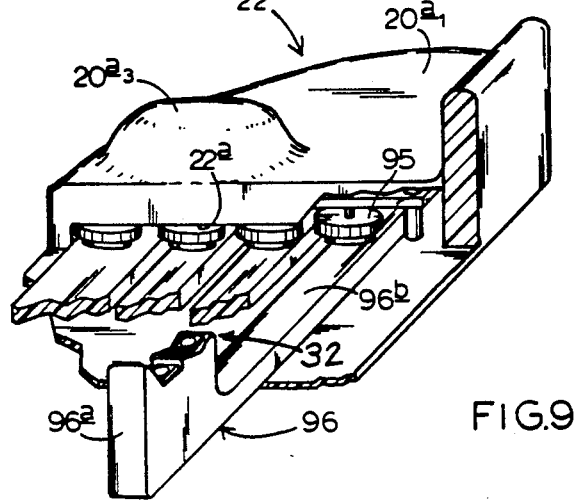
FIG. 9 is a fragmentary, top, perspective view, as if taken generally in the direction of arrow 9 in FIG. 1, illustrating how finger key clusters and their associated mounting structures are supported on a base in the device for selective positional adjustment.

Referring now to FIG. 9 along with the other figures mentioned so far herein, the mounting tongues which are provided for the key clusters' base support structures allow for positional adjustment of these structures so as to accommodate users' hands of different sizes. These tongues extend into a suitable accommodating slot, such as slot 22a in base 22, which opens on a side of the riser structures such as riser structure 20a₁. Thumb-wheel-actuated clamps, such as the clamp shown at 95, bear down on the mounting tongues, such as tongue 96b in base support structure 96 which includes a riser 96a that carries the keys in previously mentioned cluster 32.

The kind of positional adjustment which has just been described may, in a certain way, be viewed as a gross adjustment—namely, one wherein entire clusters of keys are shifted as a unit to accommodate different hand sizes. Other kinds of adjustments can certainly be made to suit different circumstances. For example, one can imagine a modification in which, say, in a given row of four keys for a finger, the mounting structure could actually be a divided structure which permits relative positional adjustment between, for example, the two keys closest to the tip of the associated finger as a unit with respect to the other two keys in the row. Accordingly, it is certainly possible to design a modified form of the keyboard proposed by the present invention which offers a relatively higher degree of positional adjustability than that displayed for illustration purposes in the drawings.

Turning attention for a moment to FIG. 5 in the drawings, here a slight modification is shown in the angular orientations of the planar support surfaces in the finger clusters. In order to make ready comparison available between FIGS. 5 and 7, the structure shown in FIG. 5 is illustrated as a modification of previously mentioned base support structure 72 holding row 82 of keys in cluster 28. The planar support surfaces for keys 82a, 82b, 82c, 82d are shown at 98, 100, 102, 104, respectively. Surfaces 98, 100 intersect one another at an obtuse angle of about 120-degrees, surfaces 100, 102 at an obtuse angle of about 170-degrees, and surfaces 102, 104 at a reflex angle of about 210-degrees. These angles may be modified to suit particular circumstances. For example, for a user with long fingernails, a more convenient angle between surfaces 98, 100 may range up to about 160-degrees.

Figure 10:
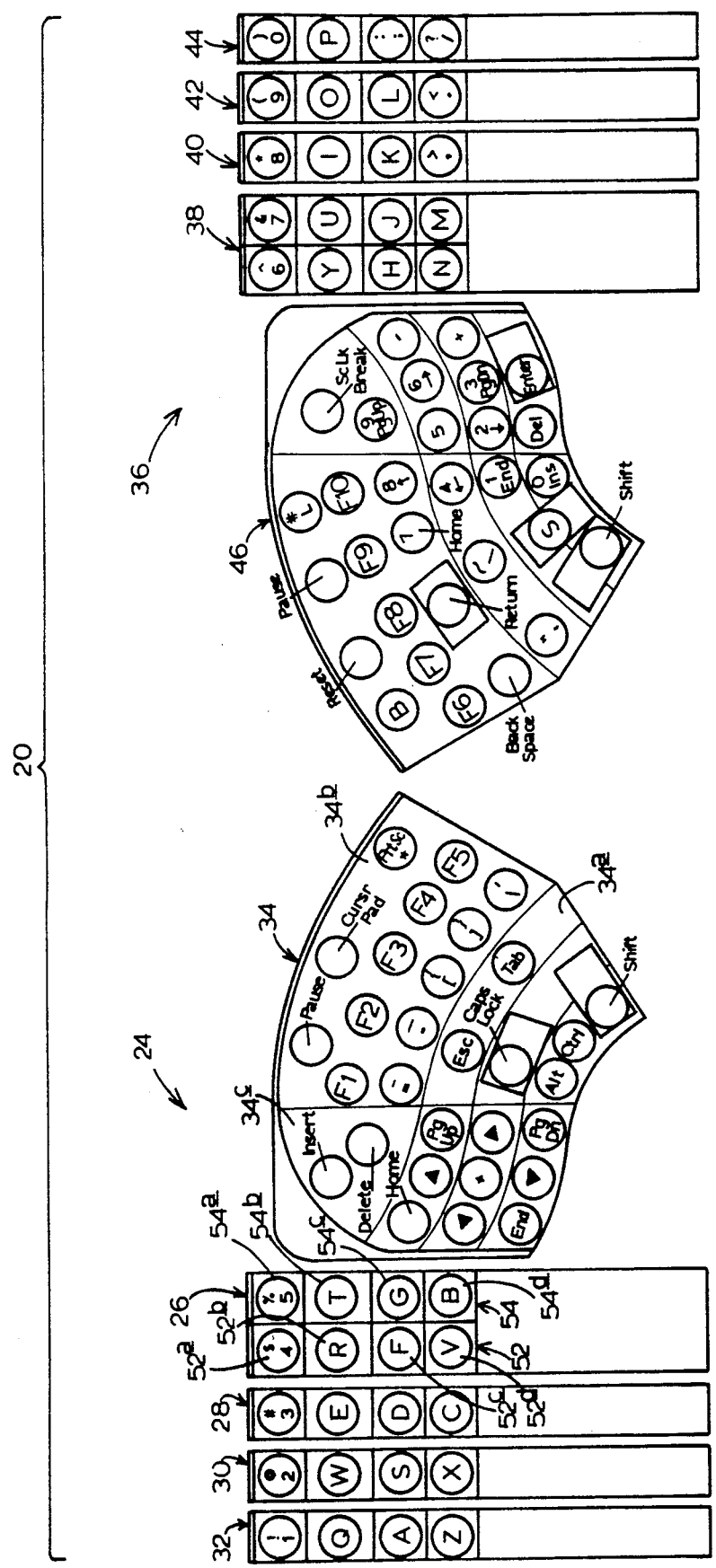
FIG. 10 is a simple, laid-out (or developed) view illustrating a typical key function assignment.

FIG. 10 in the drawings illustrates one proposed layout for keys in device 20. Keys in this figure are represented by a mix of circles and rectangles. Other layouts are of course possible.

The apparatus of the invention should thus be seen as one which offers some very distinct use advantages in the keyboard art. The unique architecture of the structure reduces, close to zero, the amount of debilitating hand-, wrist- and finger-motions which plague users of more conventional keyboards. In this respect, a principal contribution of the structure disclosed is that, at least with respect to a user's fingers, only slight gestural key-actuation motion is required, and with respect to the thumbs, only a slightly larger degree of motion is required. Adjustments can be made to suit the keyboard layout to a user's particular hand size. Mounting structures which support the keys which are organized for the fingers can, if more suitable in certain applications, be designed with key support planes which are disposed at angular offsets which are different from those that are described specifically herein.

While a preferred embodiment of the invention has been described herein, it is appreciated that variations and modifications will become apparent to those skilled in the art and may be made without departing from the spirit of the invention.

It is claimed and desired to secure by Letters Patent:

1. An ergonomic keyboard input device for the transmission of information by a human operator to an electronic system coupled with said device, comprising:
    a keyboard organized with an array of transmission-actuation keys disposed generally to compliment the splayed underside-architecture of a user's hand, said array including
    for each finger, a finger-associable cluster of input keys, each key in which is arranged facially to confront, in close proximity and in parallel planar relationship, one of various different, underside, finger-expanse portions of an associated, adjacent finger, thus to enable actuation of a selected one or more of said keys in said cluster via only slight, gestural, relatively closing motion of the confronting corresponding finger-expanse portion, wherein each finger-associable cluster is elongate, and said keys therewithin are distributed along the length of the cluster with respective key-actuation axes that intersect normal to different angularly disposed planes, one plane for each key, which planes intersect one another along the length of the cluster in a mixed pattern of obtuse and reflex angles and
    for the thumb, a thumb-associable cluster of input keys disposed generally over three mutually intersecting surfaces to enable key actuation via mixed lateral, and slight endo, translation of an associated adjacent thumb within, generally, a cone of motion whose apex resides adjacent the base of the thumb.

2. The device of claim 1, wherein said clusters extend generally radially from a region of confluence, and said device further comprises a convex, mound-like palm-rest structure located adjacent said region.

3. The device of claim 1, wherein, with regard to said finger-associable clusters, that cluster which is associable with an index finger includes two elongate rows of keys, and the other finger-associable clusters include each a single row of keys.

4. The device of claim 1, wherein, with regard to said finger-associable clusters, each cluster includes at least one elongate row of four keys, and the structure of each said row is substantially such that one key adjacent one end of the row is positioned for actuation by the tip of the ungual tuberosity of the third phalanx of the associated finger, the next adjacent key in the row is positioned for actuation by the base of the ungual tuberosity of the same finger, the next adjacent key is positioned for actuation by the base of the third phalanx of the same finger, and the fourth key adjacent the other end of the row is positioned for actuation by the head of the second phalanx of the same finger.

5. The device of claim 1 which further comprises a base, and wherein at least some of said clusters are mounted on said base for selective, relative positional adjustment.

6. An ergonomic keyboard input device for the transmission of information via human operator to an electronic system coupled with said device, comprising:
    a keyboard organized with an array of transmission-actuation keys disposed generally to complement the splayed underside-architecture of a user's hand, said array including
    for each finger, a finger-associable cluster of input keys, each key in which is arranged facially to confront, in close proximity and in parallel planar relationship, one of various different, underside, finger-expanse portions of an associated, adjacent finger, thus to enable actuation of a selected one or more of said keys in said cluster via only slight, gestural, relatively closing motion of the confronting corresponding finger-expanse portion, and
    for the thumb, a thumb-associable cluster of input keys disposed generally over three mutually intersected surfaces to enable key actuation via mixed lateral, and slight endo, translation of an associated adjacent thumb within, generally, a cone of motion whose apex resides adjacent the base of the thumb; and
    a base, wherein at least some of said clusters are mounted on said base for selective, relative positional adjustment.

7. The device of claim 1, wherein said mutually intersecting surfaces are generally orthogonal with respect to one another.

8. The device of claim 6, wherein said clusters extend generally radially from a region of confluence, and said device further comprises a convex, mound-like palm-rest structure located adjacent said region.

9. An ergonomic keyboard input device for the transmission of information by a human operator to an electronic system coupled with said device, comprising:

a keyboard organized with a pair of arrays of transmission-actuation keys, with the keys in these arrays disposed generally to complement the splayed underside-architecture of a user's hands, each said array including for each finger, a finger-associable cluster of input keys, each key of which is arranged in said cluster to confront, in close proximity with and in parallel planar relationship to the skeletal architecture of, one of various different, underside, finger-expanse portions of an associated, adjacent finger, thus to enable actuation of a selected one or more of said keys in said cluster via only slight, gestural, relatively closing motion of the confronting corresponding finger-expanse portion, and for each thumb, a thumb-associable cluster of input keys disposed generally over three mutually intersecting surfaces to enable key actuation via mixed lateral, and slight endo, translation of an associated adjacent thumb within, generally, a cone of motion whose apex resides adjacent the base of the thumb; and a base, wherein at least some of said clusters are mounted on said base for selective, relative positional adjustment.

10. The device of claim 9, wherein, within each array, said clusters extend generally from a region of confluence, and said device further comprises for each said region a convex, mound-like palm-rest structure located adjacent the region.

11. An ergonomic keyboard input device for the transmission of information by a human operator to an electronic system coupled with said device, comprising a keyboard organized with an array of transmission-actuation keys disposed generally to conform with the splayed underside-architecture of a user's hand, said array including for each finger, a finger-associable cluster of input keys, each key of which is positioned and oriented facially to confront in close proximity one of various different, underside finger-expanse portions of an associated, adjacent finger, thus to enable actuation of a selected one or more of said keys in said cluster via only slight, gestural, translatory motion of the confronting finger-expanse portion, wherein each finger-associable cluster includes an elongate row of plural keys, and said keys thereof are distributed along the length of the cluster with respective key-actuation axes normal to corresponding planes that are disposed angularly relative to one another, with a pair of planes corresponding with a first pair of adjacent keys being disposed at an obtuse angle relative to one another and with a pair of planes corresponding with a second pair of adjacent keys including one of the keys of said first pair being disposed at a reflex angle relative to one another, and a thumb-associable cluster of input keys to enable key actuation via mixed lateral, and slight endo, translation of an associated adjacent thumb within, generally, an arc of motion whose apex resides adjacent the base of the thumb.

12. The device of claim 11, wherein said thumb-associable cluster is disposed generally over three mutually intersecting surfaces to enable actuation by the thumb within, generally a cone of motion whose apex resides adjacent the base of the thumb.

13. The device of claim 11, wherein said first pair of adjacent keys of said finger-associable cluster is adjacent a first end of said elongate row associated with a proximal finger-expanse portion and said second pair of adjacent keys is distal thereto in said row.

14. The device of claim 11, wherein said second pair of adjacent keys of said finger-associable cluster is adjacent a first end of said elongate row associated with a proximal finger-expanse portion and said first pair of adjacent keys is distal thereto in said row.

15. The device of claims 13 or 14, wherein a pair of planes corresponding with a third pair of adjacent keys are disposed at an obtuse angle relative to one another and said third pair of adjacent keys is distal to said first and second pair of adjacent keys and is adjacent a second end of said elongate row associated with a terminal finger-expanse portion.

16. The device of claim 11, wherein said finger-associable clusters extend radially generally from a region of confluence, and said device further comprises a convex, mound-like palm-rest structure located adjacent said region, with the radial extents of said clusters from said palm-rest structure being dimensioned nominally to correspond with the underside-architecture of the user's hand with each finger substantially fully extended.

* * * * *